(12) United States Patent
Frasher

(10) Patent No.: US 9,981,569 B2
(45) Date of Patent: May 29, 2018

(54) RECLINABLE SEAT

(71) Applicant: VOLVO CAR CORPORATION, Gothenburg (SE)

(72) Inventor: Douglas Hall Frasher, Newbury Park, CA (US)

(73) Assignee: VOLVO CAR CORPORATION, Gothenburg (SE)

( * ) Notice: Subject to any disclaimer, the term of this patent is extended or adjusted under 35 U.S.C. 154(b) by 257 days.

(21) Appl. No.: 14/944,557

(22) Filed: Nov. 18, 2015

(65) Prior Publication Data

US 2016/0159253 A1    Jun. 9, 2016

(30) Foreign Application Priority Data

Dec. 8, 2014   (EP) .................................... 14196723

(51) Int. Cl.
*B60N 2/10*   (2006.01)
*B60N 2/20*   (2006.01)
(Continued)

(52) U.S. Cl.
CPC ............. *B60N 2/10* (2013.01); *B60N 2/0252* (2013.01); *B60N 2/20* (2013.01); *B60N 2/22* (2013.01);
(Continued)

(58) Field of Classification Search
CPC ....... A47C 1/037; A47C 1/034; A47C 1/0342; A47C 1/035
(Continued)

(56) References Cited

U.S. PATENT DOCUMENTS 275,368   A * 4/1883 Depew .................. A47C 3/026
                                                            297/302.1
1,510,275 A * 9/1924 Hearsch ................ A47C 3/025
                                                            297/302.4
(Continued)

FOREIGN PATENT DOCUMENTS

DE        19724763 A1   12/1998
DE        20103450 U1    7/2002
(Continued)

OTHER PUBLICATIONS

Extended European Search Report dated Jun. 5, 2015, Applicant No. 14196723.2-1758, Applicant Volvo Car Corporation, 5 Pages.

*Primary Examiner* — Jose V Chen
(74) *Attorney, Agent, or Firm* — Snyder, Clark, Lesch & Chung, LLP

(57) ABSTRACT

Example embodiments presented herein concern a reclinable seat comprising a base, a seat back and a seat pan. The seat pan comprises a seat bottom and a seat front, wherein the seat bottom is pivotably connected to the seat back by a first hinge member, and the seat bottom is further pivotably connected to the seat front by a second hinge member. The seat further comprises a seat bottom link arm attachable between the seat bottom and the base, and a seat front link arm attachable between the seat front and the base. The seat bottom link arm and the seat front link arm individually control a pivoting of the seat bottom and seat front, respectively, in response to a pivot of the seat back. Example embodiments presented herein further relate to a vehicle provided with a reclinable seat.

17 Claims, 11 Drawing Sheets

(51) Int. Cl.
  *B60N 2/22* (2006.01)
  *B60N 2/02* (2006.01)
  *B60R 22/26* (2006.01)
  *B64D 11/06* (2006.01)

(52) U.S. Cl.
  CPC ............... *B60N 2/75* (2018.02); *B60N 2/995* (2018.02); *B60R 22/26* (2013.01); *B64D 11/064* (2014.12); *B64D 11/0643* (2014.12)

(58) Field of Classification Search
  USPC ........................................................ 297/86, 88
  See application file for complete search history.

(56) References Cited

U.S. PATENT DOCUMENTS

| | | | | |
|---|---|---|---|---|
| 2,433,519 A | * | 12/1947 | Lorenz | A47C 1/035 297/321 |
| 2,745,470 A | * | 5/1956 | Luckhardt | A47C 1/0355 297/86 |
| 2,893,472 A | * | 7/1959 | Repaich | A47C 1/0342 297/75 |
| RE24,760 E | * | 12/1959 | Lorenz | A47C 1/035 297/69 |
| 2,948,331 A | * | 8/1960 | Schliephacke | A47C 1/0355 297/84 |
| 2,965,158 A | * | 12/1960 | Fletcher | A47C 1/0345 297/88 |
| 3,016,265 A | * | 1/1962 | Cobb | A47C 1/0342 297/423.28 |
| 3,049,375 A | * | 8/1962 | Carlson | A47C 4/46 297/29 |
| 3,926,472 A | * | 12/1975 | Evans | A47C 1/0345 297/259.2 |
| 5,013,084 A | * | 5/1991 | May | A47C 1/0355 297/85 R |
| 2010/0253129 A1 | | 10/2010 | Dowty et al. | |
| 2014/0145476 A1 | | 5/2014 | Nagayasu | |

FOREIGN PATENT DOCUMENTS

| | | |
|---|---|---|
| DE | 102007042489 A1 | 3/2009 |
| DE | 102011008345 A1 | 7/2012 |
| EP | 1632433 A1 | 3/2006 |
| FR | 2958595 A1 | 10/2011 |

* cited by examiner

RECLINABLE SEAT

CROSS-REFERENCE TO RELATED APPLICATIONS

This application claims foreign priority benefits under 35 U.S.C. § 119(a)-(d) to European patent application number EP 14196723.2, filed Dec. 8, 2014, which is incorporated by reference in its entirety.

TECHNICAL FIELD

Example embodiments presented herein relate to a reclinable seat. Example embodiments presented herein also relate to a vehicle provided with a reclinable seat. The reclining seat may be applied in vehicles such as automobiles and aeroplanes, but also in homes, offices, or any other location where it is desired to recline a seat.

BACKGROUND

Most seats for vehicle passengers are reclining seats in order for the occupant to be able to alternate between a substantially upright position and a reclined position for resting. In today's vehicles, most reclining seats have a seat pan and a seat back connected to a pivot in the seat chassis. The seat is reclined by tilting the seat back around the pivot. In vehicles configured for autonomous driving, drivers are expected to recline more often in order to gain some rest while the vehicle drives itself if the vehicle is in an autonomous driving mode. Furthermore, during an autonomous driving mode, as a driver of the vehicle is not required to be in command of the vehicle, the angle in which an occupant would typically recline the seat is likely to be increased.

SUMMARY

In conventional seats, the pivot is typically located rearward of the occupants hip point, which creates a relative motion between the occupant's back and the seat back as the seat is reclined. This relative motion results in undesirable rubbing of the occupant's back and misalignment of the seat's lumbar support relative to the occupant's back in the reclined position. Also, it creates an undesired posterior tilt of the pelvis.

An example object of some of the example embodiments presented herein is to provide a reclinable seat where the previously mentioned problem is at least partly avoided.

The example embodiments described herein relate to reclinable seat comprising a base, a seat back, and a seat pan. The seat pan comprises a seat bottom and a seat front. The seat bottom is pivotably connected to the seat back by a first hinge member and the seat bottom is further pivotably connected to the seat front by a second hinge member. The reclinable seat further comprises a seat bottom link arm attachable between the seat bottom and the base and a seat front link arm attachable between the seat front and the base. The seat bottom link arm and the seat front link arm individually control a pivoting of the seat bottom and seat front, respectively, in response to a pivot of the seat back.

The seat being reclinable means that it can assume different positions relative to the horizontal. Typical examples of such positions are an active position in which the seat back is almost vertically positioned and a resting position in which the seat back is more horizontally oriented. The base, sometimes also referred to as frame, mounting, or, armature, may be fixed to a vehicle or free-standing on, for example, a floor in a building. As used herein, the term "seat back" refers to the part of the seat towards which the back of the occupant is supposed to rest. The term "seat pan" refers to the part of the seat which is adapted to accommodate the buttocks and thighs of an occupant.

According to some of the example embodiments, the seat pan is split, specifically, the seat pan comprises two portions, a seat bottom and a seat front, which are pivotably connected by a hinge member. The seat bottom is adapted to support the pelvis and the seat front is adapted to support at least the upper portion of the thighs of the occupant.

As the seat back is pivoted, typically around a pivot point provided at the base, it exerts a force on the seat bottom via the first hinge member. The seat bottom in turn exerts a force on the seat front via the second hinge member. Hence, the pivoting of the seat back induces movements of the seat bottom and seat front as well. According to some of the example embodiments, the movements of the seat bottom and seat front are individually restricted and controlled by the respective link arms.

The arrangement enables to control the seat front and seat bottom to counter-rotate relative to the seat back at individual, prescribed ratios. This enables a rocking motion of the unit comprising the occupant and the seat elements, but where the seat front and seat bottom are allowed to relax somewhat towards the horizontal—the seat bottom to a position where it provides proper support to the pelvis and contributes positively to anti-submarining and the seat front to a position which allows the thighs to relax to a substantially horizontal angle. The rocking motion of the seat and occupant as a unit ensures that there is no relative motion between the occupant's back and the seat back. Hence, undesirable rubbing of the occupant's back and misalignment of the seat back's lumbar support relative to the occupant's back are avoided. The relaxation of the seat bottom and seat front respectively provides good comfort without compromising the pelvis orientation. Inadequate pelvis orientation may cause discomfort or pain to the occupant.

Further advantages are achieved by implementing one or several of the features of the dependent claims.

The seat back may pivot around a primary pivot point provided at the base. The primary pivot point is preferably fixed to the base. Pivoting the seat back around a pivot fixed to the base, instead of around a hinge connecting the seat back to the seat pan, provides a rocking motion of the unit comprising the seat elements and the occupant. Hence, relative motion between the seat back and the occupant's back is avoided.

The seat bottom link arm may be pivotably connected to the seat bottom at a first pivot point and to the base at a second pivot point. The seat front link arm may be pivotably connected to the seat front at a third pivot point and to the base at a fourth pivot point. The link arms are preferably rigid. The link arms are preferably of fixed length. Link arms pivotably connected to the seat front or seat bottom in one end and to the seat base in the other end restricts the movements of the seat front and seat bottom respectively along predefined circles. Hence it is easy to predict and achieve the desired movements of the seat front and seat bottom in response to a pivoting of the seat back.

The fourth pivot point may be located at the primary pivot point. Reducing the number of pivot points simplifies the geometries of the reclinable seat.

The length of the seat bottom may be within the approximate range of 18-22 centimeters as measured from the connection of the seat bottom and the seat back at the first hinge member to the connection of the seat bottom and the seat front at the second hinge member. A seat bottom length within that range locates the second hinge member near the natural fold between the thighs and the buttocks of the occupant depending on the size of the occupant. This is where the legs pivot in relation to the pelvis and naturally may relax towards the horizontal without affecting the pelvis orientation.

A first angle between the seat back and the seat bottom and a second angle between the seat bottom and the seat front may increase as the seat back is reclined. The first angle increasing means that the seat bottom counter-rotates relative to the rotating seat back. For example, if the seat back rotates clockwise, the seat bottom rotates somewhat counter-clockwise in relation to the seat back. This is advantageous, as it enables the seat bottom to help direct the force on the ischial tuberosities (i.e., sit bones) more toward the horizontal to keep the torque on the pelvis more anterior than posterior, while providing good comfort. For good sitting ergonomics, the torque on the pelvis should be anterior rather posterior in order to achieve a proper lumbar orientation.

A second angle between the seat bottom and the seat front may increase as the seat back is reclined. The second angle increasing means that the seat front counter-rotates relative to the seat back at a higher ratio than the seat bottom. The second angle increasing also means that the seat front counter-rotates relative to the seat bottom. This is advantageous, at it allows the thighs of the occupants to relax further towards the horizontal which results in a more comfortable resting position.

A control unit may mechanically or electrically control the recline angle of the seat back. As the movements of the seat front and seat bottom are coupled to the pivoting of the seat back via the link arms and hinge members, the control unit indirectly controls the seat bottom and seat front as well. An electrical control unit may be operated by the occupant by the use of a switch or a button. The electrical control unit may also be autonomously operated by an external control system such as the control system of an autonomous vehicle. A mechanical control unit may take the shape of a pin, lever, stick, knob or anything else that the occupant may operate using his/her hand or any other suitable body part. Alternatively, the control unit is a brake which acts to lock the recline angle of the seat back.

The first hinge member and/or the second hinge member may be made of an elastic material. The elastic material allows the elements interconnected by the hinge member to rotate relative to each other. Alternatively, the hinge members are made of solid components rotationally movable relative to each other.

Alternatively, the entire seat elements, in example, seat back, seat bottom, and seat front, may be made of an elastic material. In such case, the hinge members are merely constituted by the transitions from one seat element to another.

Alternatively, some of the seat elements, for example the seat back and seat bottom, may be made as a single form from a composite material constructed such that it is generally rigid, but in the area of the hinge between seat back and seat bottom is elastic, and the hinge member itself may be of made of rigid, pivotable material and connected to a rigid member attached to the part of the seat bottom forward of the elastic region of the seat bottom/seat back and to another rigid member attached to the seat back rearward of the elastic region. Thus the rigid hinge elements provide for the precise control of the seat bottom/seat back shape transformation.

The elastic material may be a structural elastic composite. For example, the elastic material may be a carbon fiber composite. Carbon fiber composites are strong and lightweight.

At least one link arm may be provided with an arm rest. Arm rests provides support for the occupant's arms. An arm rest may provide additional comfort, both in an upright position and a reclined position.

At least one shoulder belt is comprised within the seat back such that the shoulder belt rotates along with the seat to remain in a proper position relative to an occupant at all recline angles.

The example embodiments presented herein further relate to a vehicle provided with a reclinable seat as described above. The occupant of the seat may then benefit from the advantages described above. The inventive reclinable seat is especially relevant for vehicles capable of autonomous driving since more reclining is expected also for drivers.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

In the following description, for purposes of explanation and not limitation, specific details are set forth, such as particular components, elements, techniques, etc. in order to provide a thorough understanding of the example embodiments. However, it will be apparent to one skilled in the art that the example embodiments may be practiced in other manners that depart from these specific details. In other instances, detailed descriptions of well-known methods and elements are omitted so as not to obscure the description of the example embodiments. The terminology used herein is for the purpose of describing the example embodiments and is not intended to limit the embodiments presented herein.

Example embodiments presented herein are directed towards a reclinable seat. It should be appreciated that the example embodiments are discussed in relation to a vehicle seat. However, it should be appreciated that the example embodiments need not be limited to a seat in a vehicle but may be applied to any form of seat which is reclinable. It should further be appreciated that a vehicle shall be interpreted to include cars, trucks, busses and construction equipment, as well as airplanes, boats, ships, space craft and any other means of transportation.

Figure 1A:
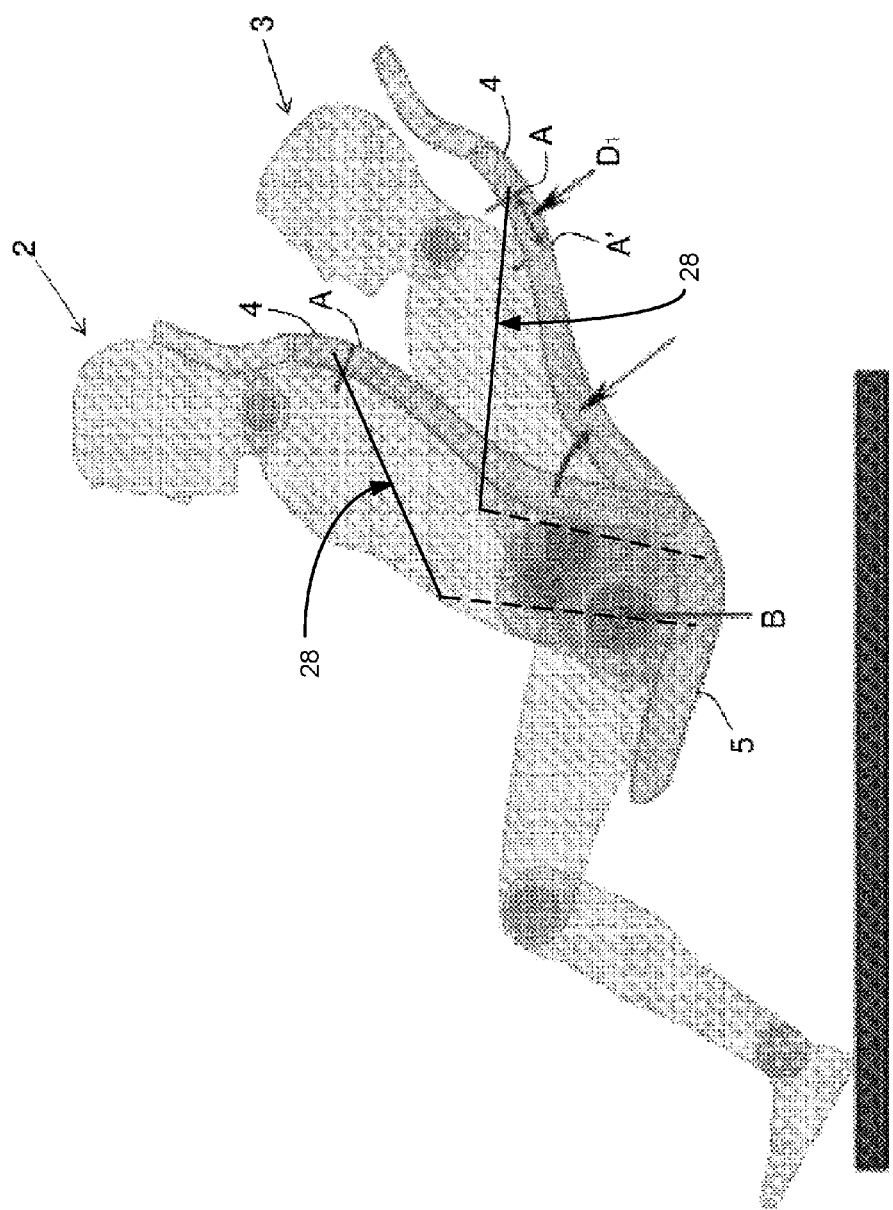
FIG. 1A illustrates a seat in an upright and reclined position.

In order to provide a better explanation of the example embodiments presented herein, a problem will first be identified and discussed. FIG. 1A illustrates an occupant sitting in a typical reclinable seat in an upright position 2 as well as a reclined position 3. The seat of FIG. 1A features a seat back 4 and a seat pan 5. In a conventional automobile seat, the seat back angle is typically some degrees past vertical, or at a positive recline angle, as illustrated in FIG. 1A. The distance between a seat occupant's upper torso and the top of the seat back 4, when the occupant is in an upright position, is denoted by the reference letter A. The location of the occupant's pelvis relative to the seat pan 5 is denoted by the reference letter B.

In the occupant's reclined position 3, the distance between the occupant's upper torso and the top of the seat back is A'. Thus, as the seat back 4 is moved to a recline position, there is a relative motion between the seat back 4 and the occupant's back. The relative motion in the example provided by FIG. 1A is denoted with the label $D_1$.

Figure 1B:
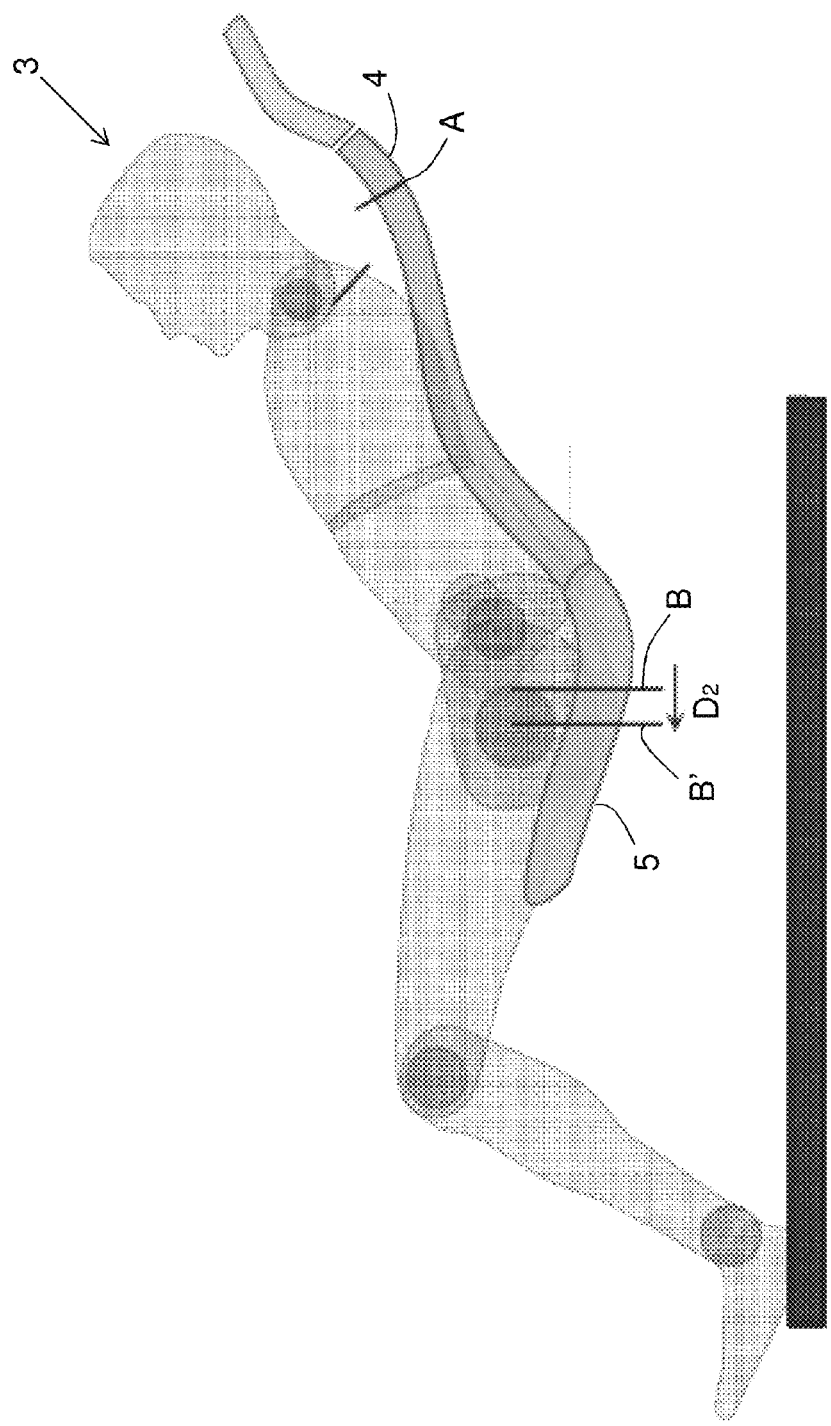
FIGS. 1B and 1C further illustrate examples of a seat in a reclined position.

FIG. 1B also illustrates the occupant in the reclined position 3. As the occupant reclines, depending on the friction between the occupant and the seat back 4, the component of force acting to slide the occupant forward in the seat increase. Due to the recline angle, the force of gravity acting on the upper body of the occupant acts to create a torque on the pelvis rotating it to an undesirable posterior tilt angle. A posterior pelvis tilt angle is undesirable as it creates uneven pressure on the discs between lumbar vertebrae. The increase in force may cause the occupant's pelvis to move forward and rotate. The position of the occupant's pelvis relative to the seat pan 5 due to the seat reclining is denoted by the label B' and the relative motion between the seat pan 5 and the occupant's pelvis is denoted by the label $D_2$.

Figure 1C:

The relative motion of the occupant's back and pelvis may lead to discomfort and poor posture of the occupant. Thus, a need exists for a reclinable seat, which eliminates or reduces such relative motion. FIG. 1C illustrates an occupant sitting in a reclined seat 6 where the distance A between the occupant's upper torso and the top of the seat back 4 is maintained. Furthermore, the location of the occupant's pelvis relative to the seat pan 5 is also maintained upon the reclining of the seat back 20. Thus, the relative motion $D_1$ and $D_2$ is avoided in the seat of FIG. 1C by maintaining the same angle between the seat pan 5 and the seat back 4 while the seat is in the upright and reclined position. However, the occupant's feet are now elevated. Such a position may not be optimal, especially if the seat is in a vehicle and the feet are in the proximity of, for example, the steering wheel. Thus, a need exists to reduce the relative motion between the seat occupant and the seat as well as maintain the feet of the occupant in a lowered position.

Figure 2A:
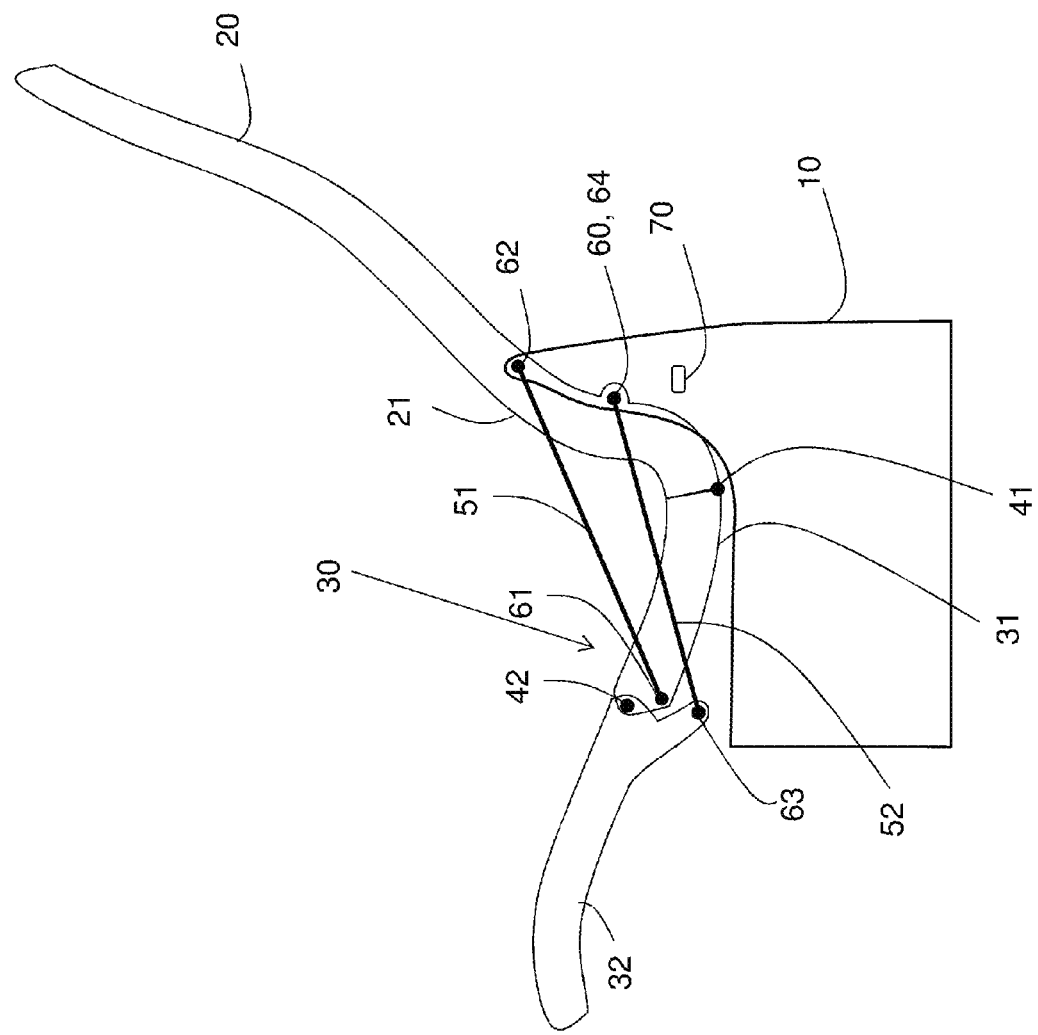
FIGS. 2A and 2B illustrate a schematic overview of a reclinable seat in non-reclined or upright position, according to some of the example embodiments presented herein.
Figure 2B:
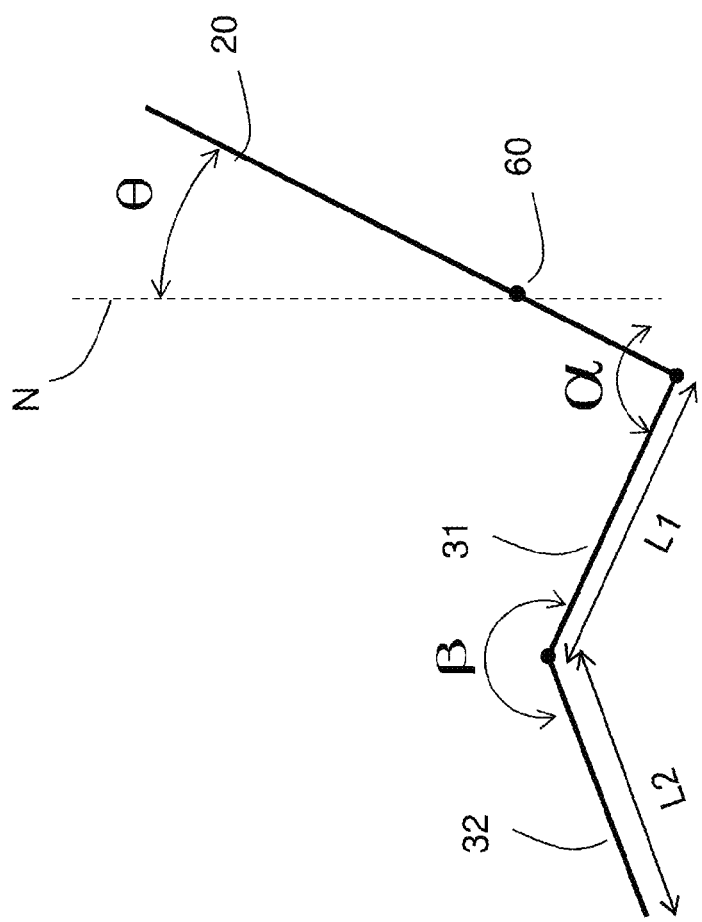

FIGS. 2A and 2B illustrate a schematic overview of a reclinable seat 1 in a non-reclined position, according to some of the example embodiments presented herein. The seat 1 comprises a base 10 to which a seat back 20 is pivotably mounted via a primary pivot 60. The seat back 20 is adapted to support the back of an occupant sitting in the seat 1. In the case of, for example, an automobile seat, the seat back recline angle θ is some degrees past the vertical N also in the non-reclined position, as seen in FIG. 2B. In order to counteract the undesired torque, as described in relation to FIG. 1B, the seat back 20 is provided with a lumbar support 21, which contributes to create a torque resulting in a desired anterior pelvis tilt.

According to some of the example embodiments, the location of the primary pivot 60 may be below and rearward of the center of gravity of the rotating unit (e.g., comprised of the occupant and rotating seat elements), such that the balance point of the unit occurs near the middle of the recline range. This allows the forces required to initiate or maintain a recline angle to be generally minimized. It should be appreciated that the center location of the rotating unit will change its position relative to the unit's elements as the unit reclines due primarily to the movement of the head and extremities of the occupant.

The height of the pivot in relation to the rotating unit should be such that a lifting of the rotating unit occurs. Such a lifting may minimize the lowering of the occupant's head due to recline, which has negative consequences for perceived comfort. The pivot 60 fixes the rotating unit to a seat base or armature, so therefore shall be located on an armature that fits without interference to other aspects of the vehicle.

It should be appreciated that the placement of the primary pivot may depend on the dimensions of the occupant. As an example, for a 95th percentile male occupant in a relatively high seating vehicle, such as an SUV, the primary pivot 60 may be located approximately 19 cm away from the hip of the occupant and 314 cm vertically above the heel contact point with the floor.

The seat back 20 is pivotably connected to the seat pan 30 via a first hinge member 41. The seat pan 30 is split into two portions, a seat bottom 31 and a seat front 32. The seat bottom 31 serves to support the ischial tuberosities, also known as the sit bones, of the occupant and the seat front 32 serves to support the thighs of the occupant. In case the occupant is tall, the seat front 32 may only support the upper portion of his/her thighs. The seat bottom 31 and seat front 32 are pivotably connected via a second hinge member 42.

The first hinge member and/or the second hinge member may be made of an elastic material. The elastic material allows the elements interconnected by the hinge member to rotate relative to each other. Alternatively, the hinge members are made of solid components rotationally movable relative to each other.

Alternatively, the entire seat elements, in example, seat back, seat bottom, and seat front, may be made of an elastic material. In such case, the hinge members are merely constituted by the transitions from one seat element to another.

Alternatively, some of the seat elements, for example the seat back and seat bottom, may be made as a single form from a composite material constructed such that it is generally rigid, but in the area of the hinge between seat back and seat bottom is elastic, and the hinge member itself may be of made of rigid, pivotable material and connected to a rigid member attached to the part of the seat bottom forward of the elastic region of the seat bottom/seat back and to another rigid member attached to the seat back rearward of the elastic region. Thus, the rigid hinge elements provide for the precise control of the seat bottom/seat back shape transformation.

The elastic material may be a structural elastic composite. For example, the elastic material may be a carbon fiber composite. Carbon fiber composites are strong and lightweight.

The length L1 of the seat bottom is adapted so that the second hinge member 42 is located near the natural crease between the legs and the buttocks of an occupant. The length L2 of the seat front is adapted to provide support for a greater portion of the length of the occupant's thighs, without interfering with the occupant's bending of his/her knees.

A first angle α describes the angle between the seat back 20 and the seat bottom 31. A second angle β describes the angle between the seat bottom 31 and the seat front 32. For the occupant to attain a proper seating position and perceive good comfort in the non-reclined position, the first angle α should be 90-100 degrees and the second angle β should be 180-190 degrees. The non-reclined position is a position with a nearly upright seat back, intended for an active occupant. In vehicles, the non-reclined position is typically a position for driving the vehicle or in any other way being active.

The seat bottom 31 and seat front 32 may rest against the base 10 when the seat is in a non-reclined position. The seat bottom 31 and seat front 32 are joined to the seat base 10 via separate link arms 51, 52. A seat bottom link arm 51 connects the seat bottom 31 to the base 10 and a seat front link arm 52 connects the seat front to the base. The link arms 51, 52 are rigid. The seat bottom link arm 51 is pivotably connected to the seat bottom 31 at a first pivot point 61 and to the seat base 10 via a second pivot point 62. The seat front link arm 52 is pivotably connected to the seat front 32 at a third pivot point 63 and to the seat base via a fourth pivot point 64. In the example embodiment of FIG. 2, the fourth pivot point 64 and primary pivot point 60 are combined into a single pivot point.

The purpose of the link arms is to control the movements of the seat bottom and seat front respectively as the seat back 20 is pivoted around the primary pivot 60. As the seat back 20 is reclined, its lowermost portion presses the seat bottom 31 in a leftward direction (in the view shown in FIG. 2A) and somewhat upward direction against the seat front 32. In response to the pressing force, the seat bottom 31 and the seat front 32 will move in a leftward and somewhat upward direction, but the respective link arm 51, 52 will restrict the movements to predefined desired paths. This will be discussed in more detail in conjunction with FIGS. 3A through 4B.

In the example of FIG. 2A, the link arms 51, 52 are straight, but they may take any shape, for example, curved or angled, as long as they do not conflict with other seat elements and as long as the endpoints, in example, the pivot points 61, 62, 63, 64, are located as prescribed. Curved or angled link arms may facilitate ingress and egress of the occupant.

Figure 2C:
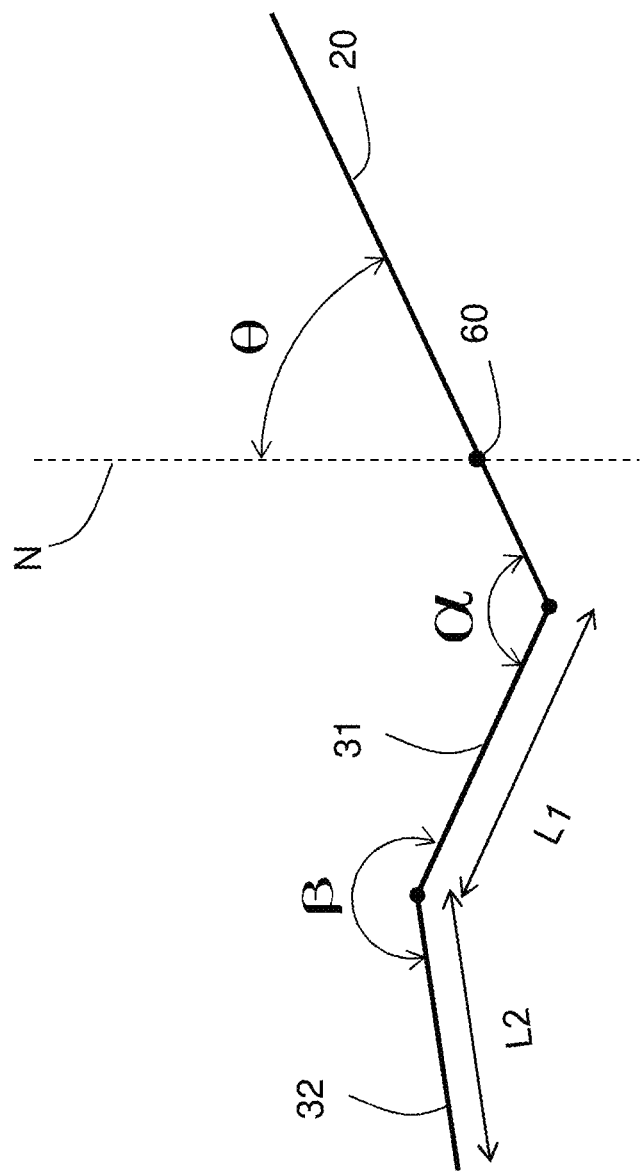
FIG. 2C shows a schematic overview of the reclinable seat for FIGS. 2A and 2B in a reclined position, according to some of the example embodiments presented herein.

FIG. 2C shows a schematic overview of the same embodiment of the reclinable seat 1 as in FIGS. 2A and 2B, but in a fully reclined position. The fully reclined position is typically adapted for resting. Here, the seat back 20 has been pivoted around the primary pivot 60 to recline towards the horizontal, increasing the recline angle θ. In the fully reclined position, the recline angle θ typically takes a value of 60-70 degrees. As the primary pivot 60 is located above the lowermost portion of the seat back 20 in the non-reclined position, pivoting of the seat back 20 to increase the recline angle θ results in the lowermost portion of the seat back 20 being lifted relative to the base. In response to the force exerted by the pivoting seat back 20 the seat bottom 31 and seat front 32 have attained their fully reclined positions. These positions are predefined and controlled by the link arms 51, 52. In the fully reclined position, the first angle α between the seat back 20 and the seat bottom 31 preferably is in the range of 120-130 degrees and the second angle β preferably is in the range of 202-212 degrees. As may be seen by comparing FIGS. 2B and 2C, both the first angle α and the second angle α are larger in the reclined position of FIG. 2C than in the non-reclined position of FIG. 2B. This is because the link arms 51, 52 causes the seat bottom 31 and seat front 32 to counter-rotate at prescribed ratios relative to the seat back 20 as the seat back 20 is reclined. The seat front 32 is controlled to counter-rotate at a higher ratio than the seat bottom 31, which is why the second angle β also increases.

The reclining of the reclinable seat 1 may be seen as rotating the seat elements and the occupants as a unit, but where sit bones to some extent and thighs to a greater extent are allowed to relax towards the horizontal. Rotating the seat elements and the occupant as a unit results in that the desirable position of the lumbar support relative to the occupant's back is retained throughout the reclining. Also, the desired pelvis orientation attained in the non-reclined position is retained.

If the seat would not allow relaxation of sit bones and thighs, the reclined position would feel unacceptably awkward as the occupant's thighs would be directed at an angle far above the horizontal. However, the relaxation shall be done while maintaining the preferred orientation of the pelvis. This is the reason to have the seat pan 30 split into a seat bottom 31 and a seat front 32. The sit bones may only be allowed to relax slightly in order to maintain the desired pelvis orientation, while the thighs must be allowed to relax to a higher extent in order for the occupant to experience the fully reclined position as comfortable. This is achieved by controlling the seat bottom 31 and the seat front 32 individually by separate link arms 51, 52.

If the seat 1 is located in a vehicle, a further reason for allowing the seat bottom 31 to relax to a lesser extent than the seat front 32 is to achieve an anti-submarining effect. In the context of vehicle seats, the term "submarining" means that occupant slides under the seat belt in case of a sudden deceleration, for example, in a frontal crash. Submarining is more probable in a reclined position where the seat belt lies on top of the occupant rather than in front of the occupant. As used herein, the term "anti-submarining" means prevention of submarining The lesser extent of relaxation of the seat bottom 31 means that the seat bottom 31 is more vertically oriented than the seat front 32. The more vertical orientation of the seat bottom 31 contributes positively to anti-submarining as the sit bones of the occupant are more effectively prevented from sliding forward during a sudden deceleration of the vehicle. To further increase the safety, the seat preferably has at least one shoulder belt which remains in the proper location for all recline angles φ. The shoulder belt is comprised within the seat back 20 and transfer restraint loads through the base 10 and into the vehicle floor structure. An exemplary implementation illustrating shoulder belt 28 is illustrated in FIG. 1A. As illustrated, shoulder belt 28 is attached to seat back 20. The shoulder belt 28 thus rotates as a unit with the occupant and therefore retains its positioning relative to the occupant at all recline angles. A proper position relative to the occupant is essential in order for the shoulder belt 28 to serve its purpose of restraining the occupant to the seat in case of a crash. Conventional shoulder belts are typically tethered to the upper vehicle body structure and do not retain their position relative to the occupant if the seat back is greatly reclined.

The reclinable seat 1 may be set to recline at any recline angle θ between the non-reclined and the fully reclined position. A control unit 70, as illustrated in FIG. 2A, sets the recline angle θ. In the example of FIG. 2C, the control unit 70 may function as a brake which acts to hold the recline angle of the seat back 20 relative to the base 10. In order to change the recline angle, the occupant may release the brake and with a slight push rearward or forward with the feet, hands, or by muscular control increase or decrease his/her back to thigh angle to start rotating the seat elements. Upon reaching the desired recline angle θ, the occupant may re-engage the brake.

If the seat 1 is located in a vehicle, the brake is automatically controlled to allow the seat to return to its upright position in the event of a crash. This is advantageous as the risk of submarining is greatly reduced in an upright position relative to a reclined position. The time required for returning from the fully reclined position to a non-reclined position is estimated to be less than one second due to the inherent tendency of the seat to return to the more stable upright position. According to some of the example embodiments, the brake control is designed so as to dissipate kinetic energy during the rotation from reclined to non-reclined positions to help reduce the crash pulse experienced by the occupant. For example, in the event of a forward collision, utilizing the distance available from the reclined position to the upright position during the deceleration helps to absorb the kinetic energy of the occupant's internal organs over a greater distance, thereby lowering the force acting on them during deceleration. The brake would be actively controlled in response to relevant data provided by various sensors prior to and during the collision.

Alternatively, the control unit 70 could be a lever which mechanically affects the position of the seat back 20. Alternatively, the control unit 70 could be a switch or a pair of buttons which electrically controls the position of the seat back 20, for example via an electric motor.

For all possible recline angles θ, the seat bottom 31 and seat front 32 are positioned relative to the seat back 20 such that the occupant attains a comfortable and ergonomically correct position.

Example dimensions of the seat pan may be 46 centimeters from the tip of the seat front 32 to the first hinge member 41. An example length of the seat bottom link arm 51 may be 30 centimeters. An example length of the seat front link arm 52 may be 27 centimeters. An example width of the seat back 20 may be 48 centimeters. An example range of the length of the seat bottom 31 is 15-25 centimeters, or more specifically, 19-21 centimeters. An example range of the length of the seat front is 24-32 centimeters, or more specifically, 28-30 centimeters.

Figure 2D:
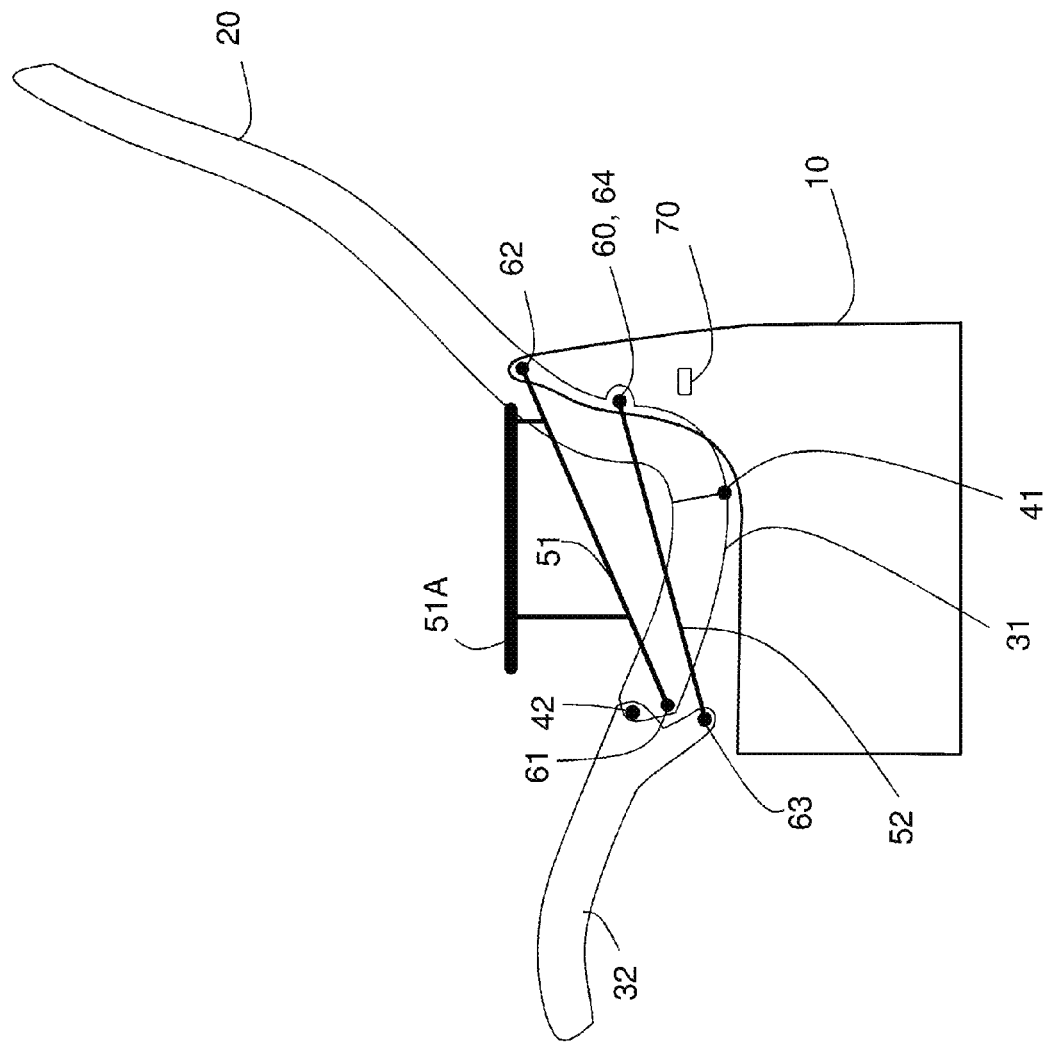
FIG. 2D illustrates a seat with a link arm comprised in an arm rest, according to some of the example embodiments presented herein.

It should be appreciated that, according to some of the example embodiments, the link arms may be comprised within an arm rest. FIG. 2D provides an example of a reclinable seat in which the seat bottom link arm 51 is comprised within an arm rest 51A.

Figure 3A:
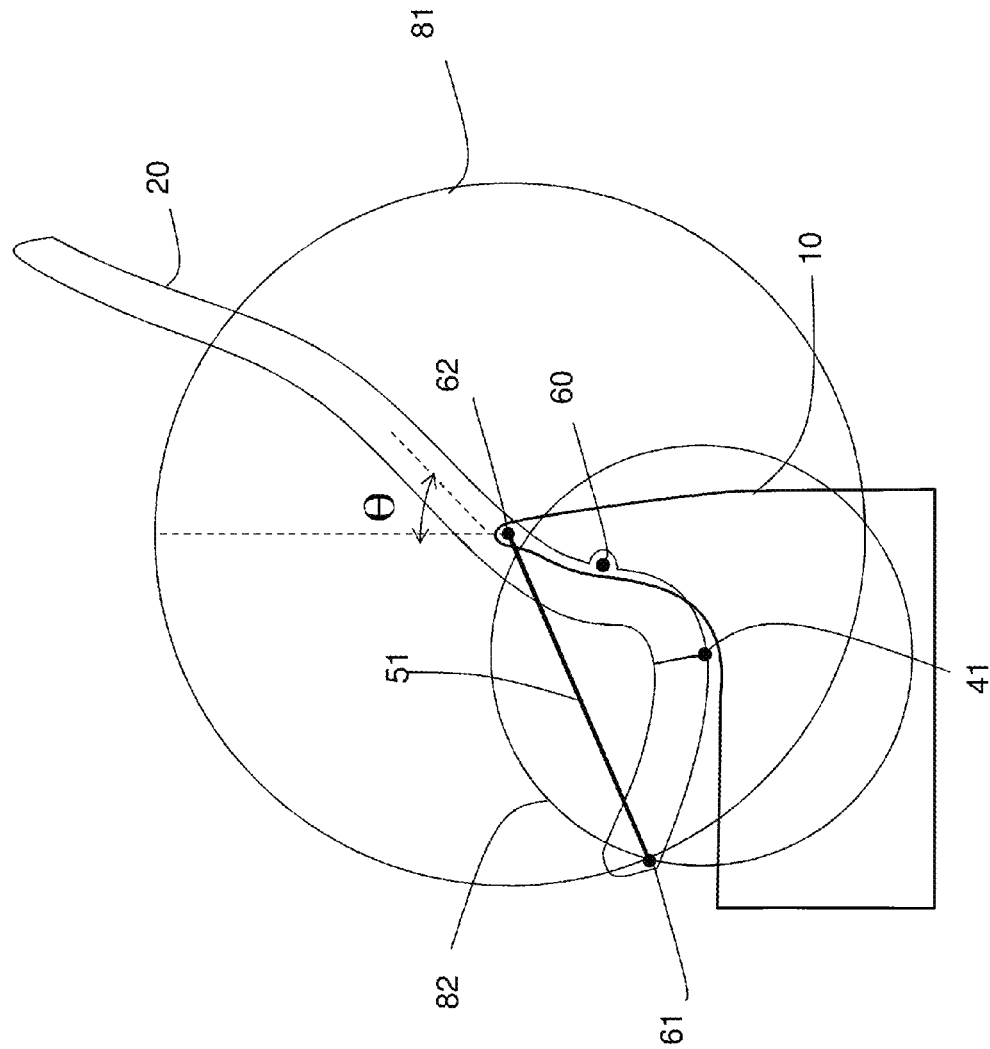
FIGS. 3A and 3B illustrate the kinematics of a seat bottom of a reclinable seat, according to some of the example embodiments presented herein.
Figure 3B:
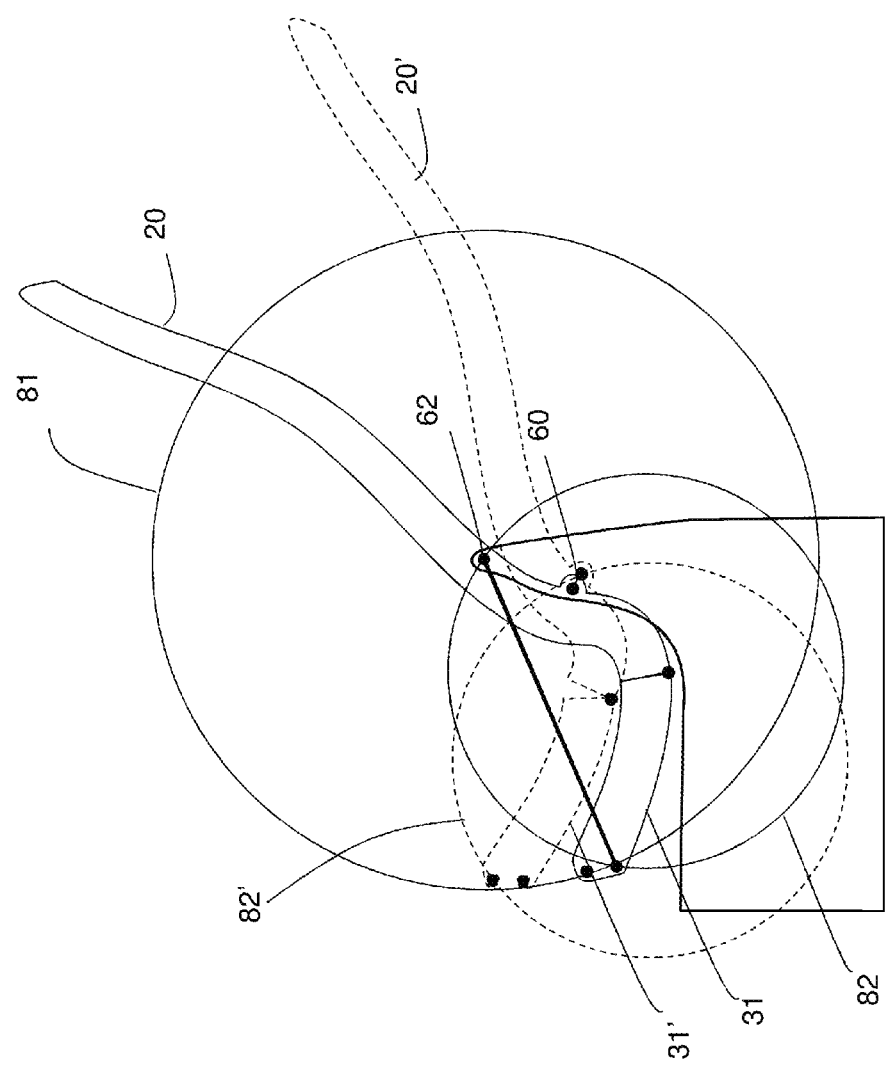

FIGS. 3A and 3B explain the kinematics of the seat bottom 31. FIG. 3A shows an example embodiment of the reclinable seat 1, however with the seat front and seat front link arm omitted for clarity. At one end, the seat bottom 31 is connected to the lowermost portion of the seat back 20 via the first hinge member 41. At its other end, at the first pivot point 61, the seat bottom 31 is connected to the second pivot point 62 provided on the stationary base 10 via the seat bottom link arm 51. The seat bottom link arm 51 is rigid and of fixed length and the second pivot point 62 is stationary. Hence, the seat bottom link arm 51 restricts the first pivot point 61, which is fixedly provided at the front end of the seat bottom 31, to move along a first circle 81 centered around the second pivot point 62 and having a radius equal to the distance between the first pivot point 61 and the second pivot point 62. In this example, the link arm 51 is straight and extends from the first pivot point 61 to the second pivot point 62. The radius of the first circle 81 is thus also equal to the length of the seat bottom link arm 51.

The movement of the first pivot point 61, and hence the front end of the seat bottom 31, is further restricted by the fact that the seat bottom 31 is pivotably connected to the seat back 20 via the first hinge member 41. This connection constrains the first pivot point 61 to move along a second circle 82 centered at the first hinge member 41 and of a radius equal to the distance between the first hinge member 41 and the first pivot point 61. Consequently, the only location in space where the first pivot point 61 can be located due to the restriction set by the first link arm 51 in combination with the restriction set by the connection of the seat bottom 31 to the seat back 20 is at the intersection of the first and second circles 81, 82. That is, for a given position of the seat back 20, there is only one possible location for the for the first pivot point 61.

According to some of the example embodiments, the first hinge member 41 may be located at the intersection of the seat back and seat bottom and rearward of the occupant's buttocks. The placement of the first hinge member 41 is provided so that any distortion in the seating comfort surface, due to the discontinuity in seat surface caused as the parts rotate relative to each other, is not in contact with the occupant. The height of the first hinge member 41 is provided near the comfort surface to minimize any gap produced between the seat back and seat pan. The height is also provided so that the upper link 51 controls the seat pan orientation relative to the seat back in the desired manner. Specifically, the upper link arm 51 controls the seat pan via the intersection of circle of radius equal to the upper link arm with a center at pivot 62 (e.g., circle 81) and the circle of radius equal to the distance from pivot 61 and hinge 41 with center at hinge 41 (e.g., circle 82). It should be appreciated that this latter circle travels with hinge 41 as the seat back rotates.

It should be appreciated that the placement of first hinge member 41 will depend on the dimensions of the occupant. As an example, for a 95th percentile male occupant in a relatively high seating vehicle such as an SUV, the first hinge member 41 may be placed 8.5 cm forward of and 9 cm below pivot 60.

According to some of the example embodiments, the pivot 62 may be located at a height and outboard location such that it does not conflict with the seat back rotation during recline. Furthermore, the location of the pivot 62 is provided so that the upper link arm 51 controls the seat pan orientation relative to the seat back in the desired manner via the intersection of circle of radius equal to the upper link arm 51 with center at pivot 62 (e.g., circle 81) and the circle of radius equal to the distance from pivot 61 and hinge 41 with center at hinge 41 (e.g., circle 82).

It should be appreciated that the placement of the pivot 62 may depend on the dimensions of the occupant. As an example, for a 95th percentile male occupant in a relatively high seating vehicle such as an SUV, the pivot 62 may be located 2 cm aft and 8 cm above the pivot 60.

According to some of the example embodiments, the pivot 61 may be located at the forward edge of the seat pan such that it does not interfere with ingress egress of the occupant or other packaging constraints. The location of the pivot 61 is also provided such that it affords that the upper link arm 51 is of a functional shape. Furthermore, the location is provided such that the upper link arm 51 controls the seat pan orientation relative to the seatback in the desired manner via the intersection of circle of radius equal to the upper link arm 51 with center at pivot 62 (e.g., circle 81) and the circle of radius equal to the distance from pivot 61 and hinge 41 with center at hinge 41 (e.g., circle 82).

It should be appreciated that the placement of the pivot 61 may depend on the dimensions of the occupant. As an example, for a 95th percentile male occupant in a relatively high seating vehicle such as an SUV, the pivot 61 may be located 26 cm forward of and 6.5 cm below the pivot 60.

FIG. 3B shows the kinematics of the seat bottom 31 as the seat back 20 is reclined, in example, pivoted around the primary pivot point 60. Pivoting of the seat back 20 around the primary pivot point 60 causes a movement of the first hinge member 41, which is fixed to the lowermost portion of the seat back 20. More specifically, the first hinge member 41 pivots around the primary pivot point 60.

As described above, the first pivot point 61 is restricted to move along a second circle 82 centered at the first hinge member 41. The second circle 82 follows the movement of the first hinge member 41, i.e., it rotates about the primary pivot point 60 along with the seat back 20, as indicated by the dashed second circle 82'. The seat bottom link arm 51 is connected to the base 10 is not affected by the seat back 20 reclining, and hence the first circle 81 remains stationary. In the reclined position of the seat back 20', the only possible location for the first pivot point 61 is at the intersection of the first circle 81 and the dashed second circle 82'.

Figure 4A:
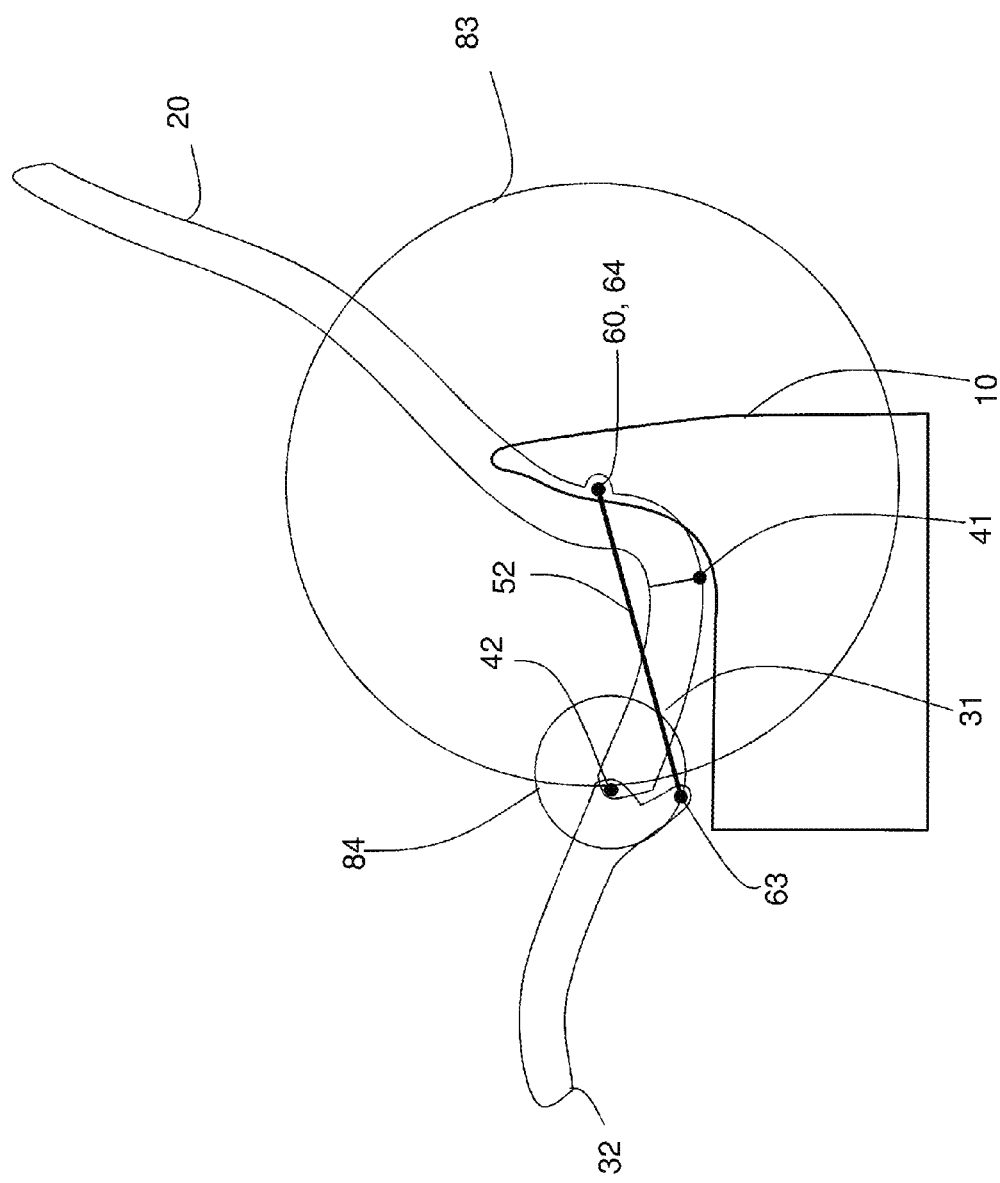
FIGS. 4A and 4B show the kinematics of the seat front in an example embodiment of the reclinable seat.
Figure 4B:
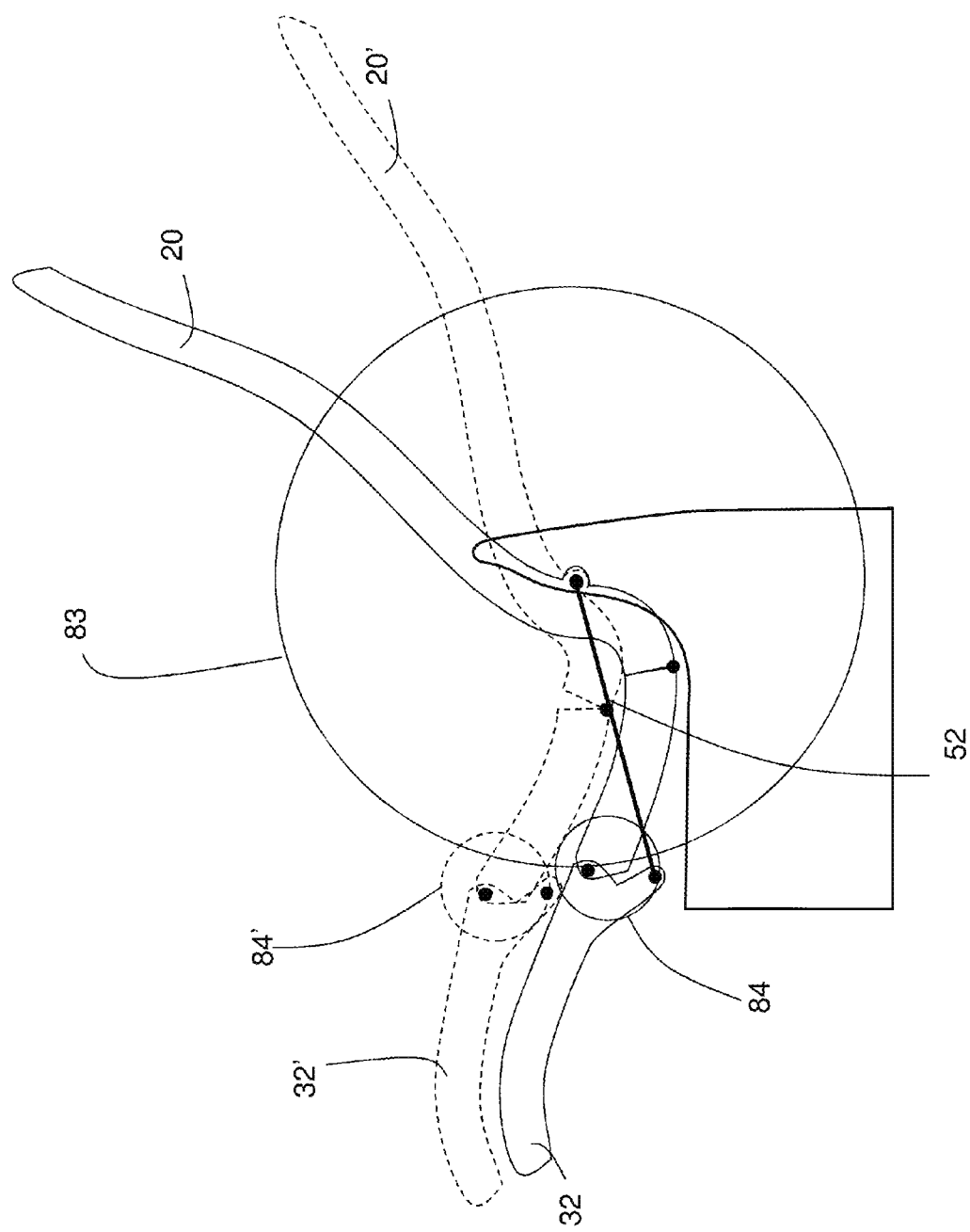

FIGS. 4A and 4B explain the kinematics of the seat front 32. FIG. 4A shows an example embodiment of the reclinable seat 1, however with the seat bottom link arm omitted for clarity. The seat front 32 is pivotably connected to the seat bottom 31 via a second hinge member 42. The seat front 32 is further connected to the stationary base 10 via a seat front link arm 52. The seat front link arm 52 pivotably connects to the seat front 32 at a third pivot point 63 fixedly provided on the seat front 32. The other end of the seat front link arm 52 pivotably connects to a fourth pivot point 64 provided on the base 10. In this example, the fourth pivot point 64 is identical to the primary pivot point 60 around which the seat back 20 is pivotable.

The seat front link arm 52 is rigid and of fixed length and the fourth pivot point 64 is stationary. Hence, the seat front link arm 52 restricts the third pivot point 63, which is fixed to the seat front 32, to move along a third circle 83 centered around the fourth pivot point 64 and having a radius equal to the distance between the third pivot point 63 and the fourth pivot point 64. In this example, the link arm 52 is straight and extends from the third pivot point 63 to the fourth pivot point 64. The radius of the third circle 83 is thus also equal to the length of the seat front link arm 52. The movement of the third pivot point 63, and hence of the seat front 32, is further limited by the fact that the seat front 32 is pivotably connected to the seat bottom 31 via the second hinge member 42. This connection restricts the third pivot point 63 to move along a fourth circle 84 centered at the second hinge member 42 and of a radius equal to the distance between the second hinge member 42 and the third pivot point 63. The only location in space where the third pivot point 63 possibly can be located due to the restriction set by the second link arm 52 in combination with the restriction set by the connection of the seat front 32 to the seat bottom 31 is at the intersection of the third and fourth circles 83, 84. That is, for a given position of the seat bottom 31, there is only one possible location for the for the third pivot point 63 and hence for the seat front 32. As there is only one possible location for the first pivot point 61 on the seat bottom 31 for a given position of the seat back 20, it follows that for a given position of the seat back 20, there is only one possible location for the third pivot point 63 and hence for the seat front 32.

According to some of the example embodiments, the pivot 63 may be located such that the forces produced at pivots 63 and 60 are manageable, i.e., as far from hinge 42 as possible without interference to other parts and function. Furthermore, the location of the pivot 63 may be provided such that the lower link arm 52 is of a functional shape. Also, the location of the pivot 63 may be provided so that the lower link arm 52 controls the seat front orientation relative to the seat bottom in the desired manner via the intersection of circle of radius equal to the distance between pivot 60 and pivot 63 with center at pivot 60 (e.g., circle 83) and the circle of radius equal to the distance between hinge 42 and pivot 63 with center at hinge 42 (e.g., circle 84). It should be appreciated that this latter circle travels with hinge 42 as the seat is reclined.

According to some of the example embodiments, the location of the pivot 63 may depend on the dimensions of the occupant. As an example, for a 95th percentile male occupant in a relatively high seating vehicle such as an SUV, the pivot 63 may be located 27 cm forward of and 9.7 cm below the pivot 60.

According to some of the example embodiments, the hinge 42 may be located near to the natural crease between thigh and buttocks of occupant. Furthermore, the location of the hinge 42 may be provided near the comfort surface of the seat to minimize the gap formed at surface as the seat front 32 rotates relative to seat bottom, and the outboard of the comfort surfaces and inboard of any styling surface designed to cover the seat mechanism. The location of the hinge 42 is further provided so that the lower link arm 52 controls the seat front orientation relative to the seat bottom in the desired manner via the intersection of circle of radius equal to the distance between pivot 60 and pivot 63 with center at pivot 60 (e.g., circle 83) and the circle of radius equal to the distance between hinge 42 and pivot 63 with center at hinge 42 (e.g., circle 84).

According to some of the example embodiments, the location of the hinge 42 may depend on the dimensions of the occupant. As an example, for a 95th percentile male occupant in a relatively high seating vehicle such as an SUV, the hinge 42 may be located 27 cm forward of and 10 cm below the pivot 60.

FIG. 4B shows the kinematics of the seat front as the seat back 20 is reclined, in example, pivoted around the primary pivot point 60. Pivoting of the seat back 20 around the primary pivot point 60 causes the seat bottom 31 to move in a specific manner as described above in conjunction with FIGS. 3A and 3B. As the seat front 32 is pivotably connected to the seat bottom 31 via the second hinge member 42, it is indirectly affected by the pivoting of the seat back 20. As described above, the third pivot point 63 on the seat front 32 is restricted to move along the circumference of the fourth circle 84 which is centered on the second hinge member 42. The second hinge member 42 is fixed to the seat bottom 31, and as the seat bottom moves, the second hinge member 42 moves along. The fourth circle 84 follows the movement of the second hinge member 42, as indicated by the dashed fourth circle 84'. The seat front link arm 52 is connected to the stationary base 10, and the third circle 83 is hence not affected by the reclining of the seat back 20. In the reclined position of the seat back 20', the only possible location for the third pivot point 63 is at the intersection of the third circle 83 and the dashed fourth circle 84'.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. Reference signs mentioned in the claims should not be seen as limiting the extent of the matter protected by the claims-their function is only to make the claims easier to understand.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims. Additionally, the features of various implementing embodiments may be combined to form further embodiments of the invention.

What is claimed is:

1. A reclinable seat comprising:
   a base;
   a seat back;
   a seat pan including a seat bottom and a seat front, wherein the seat bottom is pivotably connected to the seat back by a first hinge member and the seat bottom is further pivotably connected to the seat front by a second hinge member;
   a seat bottom link arm attachable between the seat bottom and the base, wherein the seat bottom link arm is rigid and of a fixed length, and wherein the seat bottom link arm is attached to the seat bottom at an end of the seat bottom that is adjacent the second hinge member; and
   a seat front link arm attachable between the seat front and the base, wherein the seat front link arm is rigid and of a fixed length, and wherein the seat front link arm is attached to the seat front at an end of the seat front that is adjacent the second hinge member;
   wherein the seat bottom link arm and the seat front link arm are configured to individually control pivoting of the seat bottom and the seat front, respectively, in response to pivotal movement of the seat back.

2. The reclinable seat according to claim 1 wherein the seat back is pivotably mounted to the base at a primary pivot point provided at the base.

3. The reclinable seat according to claim 2 wherein the seat bottom link arm is pivotably connected to the seat bottom at a first pivot point and to the base at a second pivot point, and the seat front link arm is pivotably connected to the seat front at a third pivot point and to the base at a fourth pivot point.

4. The reclinable seat according to claim 3 wherein the fourth pivot point is located at the primary pivot point.

5. The reclinable seat of claim 3, wherein the second pivot point is stationary.

6. The reclinable seat of claim 3, wherein the fourth pivot point is stationary.

7. The reclinable seat according to claim 1 wherein the seat bottom has a length in the range of 15-25 centimeters.

8. The reclinable seat according to claim 1 wherein the seat front has a length in the range of 24-32 centimeters.

9. The reclinable seat according to claim 1 wherein a first angle between the seat back and the seat bottom increases as the seat back is reclined.

10. The reclinable seat according to claim 9 wherein a second angle between the seat bottom and the seat front increases as the seat back is reclined.

11. The reclinable seat according to claim 1 further comprising a control unit configured to mechanically or electrically control recline angle of the seat back.

12. The reclinable seat according to claim 1 wherein the first hinge member or the second hinge member is made of an elastic material.

13. The reclinable seat according to claim 12 wherein the elastic material comprises a structural elastic composite.

14. The reclinable seat according to claim 12 wherein the elastic material comprises a carbon fiber composite.

15. The reclinable seat according to claim 1 wherein at least one of the seat bottom link arm and the seat front link arm is provided within an arm rest.

16. The reclinable seat according to claim 1 further comprising at least one shoulder belt comprised within the seat back, wherein the at least one shoulder belt is configured to rotate along with the seat back to remain in position relative to an occupant at all recline angles of the seat back.

17. A vehicle comprising a reclinable seat according to claim 1.

\* \* \* \* \*